United States Patent
Kowal

[15] 3,665,591
[45] May 30, 1972

[54] METHOD OF MAKING UP AN EXPANDABLE INSERT FITTING

[72] Inventor: Leonard J. Kowal, Prospect Heights, Ill.
[73] Assignee: Imperial-Eastman Corporation, Chicago, Ill.
[22] Filed: Jan. 2, 1970
[21] Appl. No.: 127

[52] U.S. Cl. .................................29/507, 29/523, 29/237
[51] Int. Cl. .....................................B21d 39/00, B23p 11/02
[58] Field of Search .........................29/507, 237, 523

[56] References Cited

UNITED STATES PATENTS

| 1,646,384 | 10/1927 | Bergstrom | 29/523 UX |
| 1,759,224 | 5/1930 | Dick et al. | 29/507 |
| 2,268,088 | 12/1941 | Scholtes | 29/507 |

FOREIGN PATENTS OR APPLICATIONS 543,661  3/1942  Great Britain...........................29/523

*Primary Examiner*—Charlie T. Moon
*Attorney*—Hofgren, Wegner, Allen, Stellman & McCord

[57] ABSTRACT

A method of making-up a fitting having a deformable insert adapted to be disposed coaxially within a tube end. The insert is expanded by a punch having spaced annular swaging portions of progressively increasing diameter whereby successive enlarging operations are effected as a result of an axial movement of the punch through the insert. The punch includes a shaft with the annular swaging portions being formed integrally with the shaft. The enlarging portions may be uniformly axially spaced to assure the action of only a single swaging portion on the insert at a given time.

7 Claims, 8 Drawing Figures

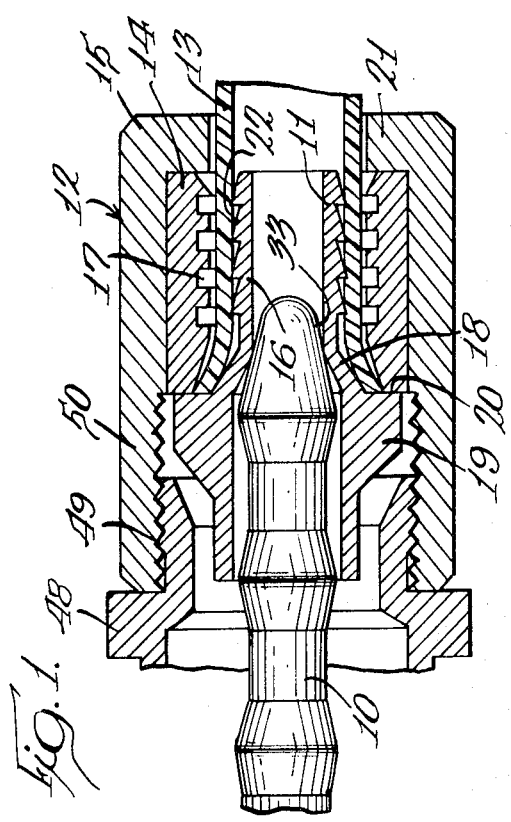

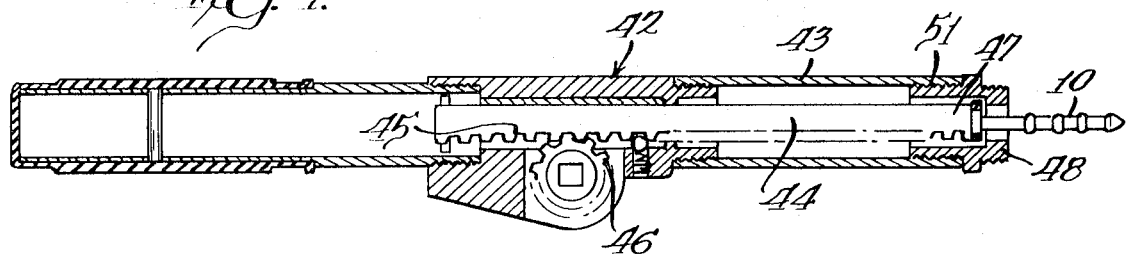
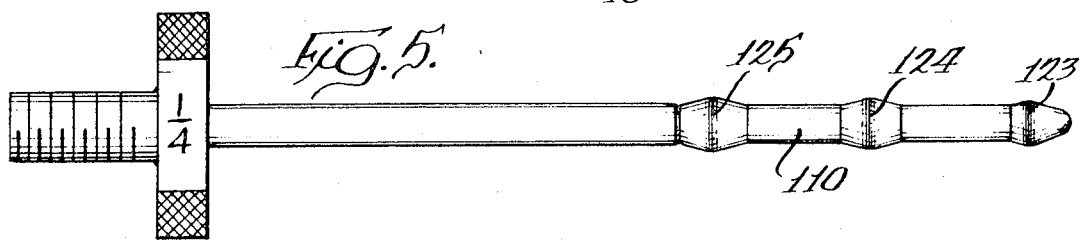
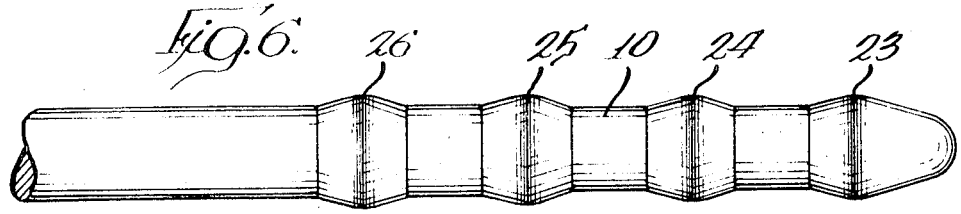
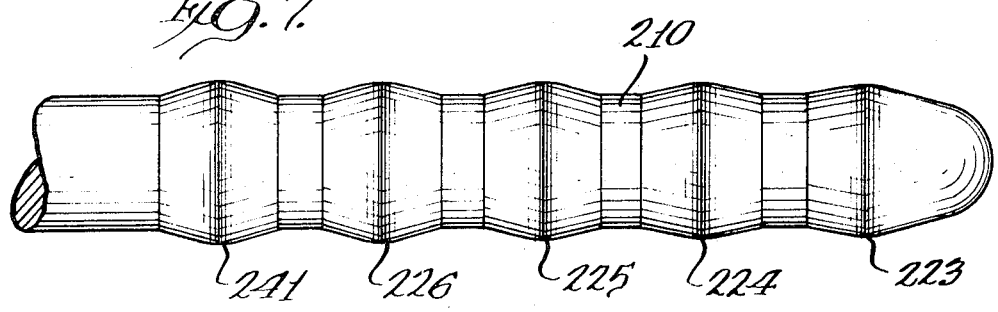
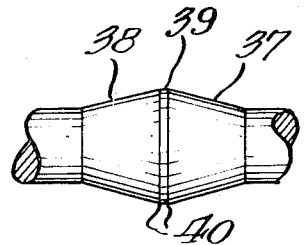

METHOD OF MAKING UP AN EXPANDABLE INSERT FITTING

BACKGROUND OF THE INVENTION

1. Field of the Invention

This invention relates to tube fittings and in particular to methods and apparatus for making-up expandable insert-type tube fittings.

2. Description of the Prior Art

In one form of tube fitting, a connector structure is sealingly secured to the end of the tube by means of an expandable insert received within the duct and clamping the duct end against an outer, substantially rigid annular shell. In making-up the fitting, the insert is radially expanded such as by forcing a swaging tool through the insert. Substantial forces are developed in the expanding operation and the known tools for effecting such expansion have the serious disadvantages of relative complexity, large size, difficulty of handling, relatively high cost, etc.

SUMMARY OF THE INVENTION

The present invention comprehends an improved method of making-up a fitting having a deformable insert wherein the insert is expanded by a series of steps effected by a coaxial movement of a series of annular swaging elements through the insert. The swaging elements are preferably axially spaced sufficiently to limit the enlarging operation to a single swaging element at a given time.

The swaging portions may define integral enlargements on a rigid shaft of a suitable punch. The enlargements may be uniformly axially spaced on the shaft and may be defined by frustoconical forwardly narrowing leading surfaces, frustoconical rearwardly narrowing trailing surfaces, and a rounded expanding means surface blended into the frustoconical leading and trailing surfaces.

BRIEF DESCRIPTION OF THE DRAWING

Other features and advantages of the invention will be apparent from the following description taken in connection with the accompanying drawing wherein:

FIG. 1 is a fragmentary enlarged diametric section illustrating the use of a portion of a punch embodying the invention in use in radially enlarging the insert of an expandable insert fitting;

FIG. 2 is a view similar to that of FIG. 1 showing a second step in the insert expanding operation;

FIG. 3 is a view generally similar to that of FIG. 1 showing a final step in the insert expanding operation;

FIG. 4 is a reduced diametric section of a hand tool suitable for use in making-up a fitting by means of the punch;

FIG. 5 is a side elevation of a punch;

FIG. 6 is a fragmentary side elevation of a larger punch;

FIG. 7 is a fragmentary side elevation of a still larger punch; and

FIG. 8 is a fragmentary side elevation of a swaging portion of the punch.

DESCRIPTION OF THE PREFERRED EMBODIMENT

In the exemplary embodiment of the invention as disclosed in the drawing, a punch generally designated 10 is adapted for radially expanding a deformable insert 11 of a fitting 12 to effect a sealed connection of the fitting to a duct end 13. The fitting further includes a substantially rigid annular shell 14 extending coaxially outwardly about the duct end 13 and a nut member 15 extending about the assembly of the insert, duct end, and shell.

In making-up the fitting, punch 10 causes a radial expansion of an axially inner portion 16 of the insert so as to clamp the duct end 13 sealingly outwardly against a ribbed surface 17 of the shell. To facilitate the radial expansion of insert portion 16, a thin connecting portion 18 is utilized to connect the expandable portion 16 to a rigid outer portion 19 of the insert. Outer portion 19 defines an axially inwardly facing shoulder 20 which abuts the outer end of the shell. Nut member 15 includes an inturned outer flange 21. Therefore, a force acting to urge the insert inwardly causes shoulder 20 to bear against shell 14 and shell 14, in turn, to bear against flange 21 to accurately position the insert and shell in the nut member during make-up of the fitting. The insert may be provided with a barbed outer surface 22 to provide further enhanced sealing engagement of the insert with the duct end 13. As indicated briefly above, the present invention comprehends the expansion of insert portion 16a by punch 10 in a series of enlarging steps effected by the axial movement of the punch through the insert. As shown in FIG. 2, punch 10 includes a first radially enlarged annular swaging portion 23, a second further enlarged annular swaging portion 24, a third yet further enlarged annular swaging portion 25, and a fourth still further enlarged annular swaging portion 26. Thus, in passing axially through the insert, swaging portion 23 first engages the frustoconical connecting member 18 as best seen in FIG. 1, expanding the insert portion 16 to a first enlarged diameter as seen in FIG. 2. The swaging portions of punch 10 are preferably spaced apart a distance at least equal to the length of the insert portion 16 to minimize the force necessary to effect the expansion operation. Thus, when the initial swaging portion 23 passes inwardly beyond the distal end 27 of the insert portion 16, the second swaging portion 24 engages the outer end 28 of the insert portion 16 to commence the second step of enlargement of the insert portion as a result of further axial movement of the punch through the insert. When the second swaging portion portion 24 passes beyond distal end 27, the third swaging portion 25 commences further enlargement of the insert portion 16 and when swaging portion 25 passes beyond distal end 27, the fourth swaging portion 26 commences final enlargement of the insert portion 16 to complete the enlargement of insert portion 16 to a diameter substantially equal to the interior diameter of insert portion 19 as shown in FIG. 3. Illustratively, where the punch is adapted for use with a fitting suitable for connection to ½-inch tubing, the swaging portions may be spaced apart approximately nine-sixteenths inch, swaging portion 23 may have a maximum diameter of 0.335 inch to 0.339 inch, swaging portion 24 may have a diameter of 0.350 inch to 0.354 inch, swaging portion 25 may have a diameter of 0.365 inch to 0.369 inch, and swaging portion 26 may have an outer diameter of 0.380 inch to 0.284 inch. The punch may be formed of a suitable material such as steel. The punch defines a shaft 29 having a connecting end 30 provided with a threaded portion 31 adapted to be received in a threaded recess 32 of a suitable manipulating tool. Shaft 29 of the illustrated ½-inch tubing size punch may have a diameter of five-sixteenths inch and may have an over-all length of approximately 4½ inches.

The nose of the punch defines a frustoconical outer surface 33 for facilitated entry thereof of the punch through the insert. Illustratively, the surface 33 may have an angle to the axis of approximately 15°. Intermediate the leading swaging portions, shaft 29 may be reduced in diameter. Thus, surface 34 between swaging portions 23 and 24 may have a diameter of nine thirty-seconds inch and surface 35 between swaging portions 24 and 25 may have a diameter of nine thirty-seconds inch. Surface 36 between swaging portions 25 and 26 may have the full shaft diameter of five-sixteenths inch.

The individual swaging portions are made frusto-conical of a frustoconical inwardly narrowing leading surface 37, a frustoconical outwardly narrowing trailing surface 38, and a rounded swaging surface 39 as best seen in FIG. 8. Illustratively, the surface 39 may comprise a surface formed from an original cylindrical surface having an axial length of approximately 0.015 inch to 0.030 inch. The edges 40 of surface 39 are blended with the surfaces 37 and 38 as by means of filing and sanding with a suitable emery cloth. The enlarged portion 39 is then polished and butted to at lease one-sixteenth inch to either side of the edges 40 to complete the blending operation.

In FIGS. 5 and 7, additional punches, such as punches 110 and 210 are illustrated. Each of these punches is similar to punch 10 but is adapted for use with a different size duct end. In each instance, however, the swaging portions are enlarged progressively from the distal end of the punch to provide a suitable stepped radial expansion of the corresponding insert. Thus, in FIG. 5, in a punch suitable for use with ¼-inch tube fittings, swaging portion 123 may have a diameter of 0.140 inch to 0.144 inch, swaging portion 124 may have a diameter of 0.160 inch to 0.164 inch, and swaging portion 125 may have a diameter of 0.175 inch to 0.179 inch. In FIG. 6, punch 10 is illustrated for purposes of illustrating the size and spacing of the swaging portions in comparison with those of the other illustrated punches. In FIG. 7, a punch suitable for use with ¾-inch tube fittings is illustrated to have five swaging portions, the first portion 223 having an outer diameter of 0.530 inch to 0.534 inch, the second swaging portion 224 having an outer diameter of 0.545 inch to 0.549 inch, the third swaging portion 225 having an outer diameter of 0.555 inch to 0.559 inch, the fourth swaging portion 226 having an outer diameter of 0.565 inch to 0.569 inch, and the fifth swaging portion 241 having an outer diameter of 0.571 inch to 0.575 inch. Punch 110 may have an over-all length of 3 45/64 inches and punch 210 may have an over-all length of 5 3/16 inches. In each case, the spacing of the swaging portions axially of the punch is sufficient to cause only a single punch to be in contact with the expanding insert as the punch is passed coaxially therethrough.

In FIG. 4, a suitable hand tool generally designated 42 is shown with the punch 10 mounted thereon. Thus, hand tool 42 may comprise a housing 43, a shaft 44 carrying a rack 45 to be driven by a suitable pinion 46 to move the punch 10 carried at the distal end 47 of the shaft inwardly and outwardly through a forward end 48 of the housing.

As shown in FIG. 1, housing portion 48 may include a threading end portion 49 onto which a threaded portion 50 of the nut member 15 may be threaded to dispose the fitting parts in proper position for engagement by the punch 10. Other suitable tools for utilization of the punches may be utilized within the scope of the invention.

Thus, in use of the punches, the operator merely provides the correct punch for the fitting to be made up, threading the punch portion 31 onto the threaded recess 32 in the distal end portion 47 of the shaft 44. The forward end portion 48 of housing 43 comprises a separable member which may be secured to the housing by suitable threaded means 51 to permit substitution of different size portions 58 for using different size fittings. The tool housing portion 48 is threaded onto the housing and the loosely assembled insert duct end, shell and nut member are secured to the housing end 48 by threaded engagement of the threaded portion 50 of the nut member 15 with the threaded end portion 49 of the housing portion 48. Punch 10 is then urged outwardly through the end portion 48 to force leading surface 33 against the frustoconical connecting portion 18 of the insert. Such engagement urges the insert duct end and shell to the right, as seen in FIG. 1, to a position controlled by abutment of the shell with nut flange 21. Then the forward movement of the punch is continued until all swaging portions thereof are successively passed through the insert. As only one swaging portion is in engagement with the insert at a given time, the force necessary to effect the swaging operation is effectively minimized while yet the swaging operation may be quickly effected by the simple rectilinear movement of the punch through the insert.

Upon completion of the expansion of the insert to the made-up condition of FIG. 3, the punch is withdrawn rearwardly through the housing end portion 48 whereupon the nut member 15 may be unthreaded from the end portion 48 and the now made-up fitting assembly removed from the tool readying the tool for a subsequent make-up of other fittings as desired.

The foregoing disclosure of specific embodiments is illustrative of the broad inventive concepts comprehended by the invention.

I claim:

1. A method of making-up a fitting having a deformable insert adapted to be disposed coaxially within a tube end, and an effectively rigid shell adapted to be disposed coaxially about said tube end, said method comprising the steps of:

retaining the insert, tube end, and shell in substantially axially fixed, concentric relationship;

coaxially inserting into said insert an expanding tool having a plurality of axially spaced, sequentially diametrically larger expanding means;

urging the first expanding means of said tool coaxially fully through said insert to provide an internal radial expansion thereof; and subsequently urging the larger diameter expanding means of said tool coaxially fully through said insert to provide a further nonconcurrent radial expansion of the insert sufficient to cause sealing compression of the tube end between the expanded insert and the surrounding shell.

2. The method of making-up a fitting of claim 1 wherein said expanding means are spaced apart a distance substantially equal to the axial length of the insert.

3. The method of making-up a fitting of claim 1 wherein the diameters of the respective expanding means are preselected to provide sequentially smaller differences therebetween whereby the amount of radial expansion of the insert by the successively inserted expanding means decreases sequentially.

4. The method of making-up a fitting of claim 1 wherein the respective expanding means have an axial extent of approximately 1 to 3 mils.

5. The method of making-up a fitting of claim 1 wherein a clearance between the insert and the expanding tool is provided intermediate the respective expanding means.

6. The method of making-up a fitting of claim wherein the insert is transaxially movably retained during make-up of the fitting to permit self-centering of the insert relative to the expanding means.

7. The method of making-up a fitting of claim 1 wherein the expanding means are carried on a cantilevered support to permit limited self-centering of the expanding means relative to the fitting.

* * * * *